US009322205B2

(12) United States Patent
Dawber

(10) Patent No.: US 9,322,205 B2
(45) Date of Patent: Apr. 26, 2016

(54) SECURITY APPARATUS

(75) Inventor: Fred Dawber, Burlington, CA (US)

(73) Assignee: Farpointe Data, Inc., Sunnyvale, CA (US)

( * ) Notice: Subject to any disclaimer, the term of this patent is extended or adjusted under 35 U.S.C. 154(b) by 147 days.

(21) Appl. No.: 13/600,597

(22) Filed: Aug. 31, 2012

(65) Prior Publication Data

US 2013/0227885 A1 Sep. 5, 2013

Related U.S. Application Data

(60) Provisional application No. 61/597,878, filed on Feb. 13, 2012.

(51) Int. Cl.

| | |
|---|---|
| ***G06K 5/00*** | (2006.01) |
| ***E05F 15/20*** | (2006.01) |
| ***E05F 15/76*** | (2015.01) |

(52) U.S. Cl.

CPC ............. *E05F 15/2076* (2013.01); *E05F 15/76* (2015.01); *E05Y 2900/132* (2013.01)

(58) Field of Classification Search

CPC ..... E05B 65/00; E05B 47/00; E05B 17/2003; E05B 2047/0067; E05B 43/005; E05B 47/0002; E05B 47/02; E05B 47/026; G06K 13/0875; G06K 19/07732; G06K 2209/01; G06K 2209/015; G06K 7/0008; G06K 9/38; G06K 9/6857; G06K 13/08; E05Y 2201/434; E05Y 2400/80; E05Y 2600/626

USPC ................................ 235/382; 540/5.73, 5.64

See application file for complete search history.

(56) References Cited

U.S. PATENT DOCUMENTS

| | | | | |
|---|---|---|---|---|
| 8,643,468 | B1 * | 2/2014 | Peabody et al. | 340/5.73 |
| 2002/0196123 | A1 * | 12/2002 | Diehl et al. | 340/5.64 |
| 2005/0024221 | A1 * | 2/2005 | Jamison-Lenz et al. | 340/686.1 |

* cited by examiner

*Primary Examiner* — Thien T Mai

(74) *Attorney, Agent, or Firm* — Nixon Peabody LLP

(57) ABSTRACT

Disclosed is apparatus for use with: an RFID proximity card; a frame including a pair of jambs; a door hingedly connected to one of the jambs, the other being hollow and having a rabbet defined by a pair of surfaces, one surface presenting to the closed door and defining part of a stop against which the door is positioned when closed and the other surface flanking and presenting towards the door edge when closed. The other surface width is in the direction which defines the one jamb depth. The one jamb thickness is in the direction which defines the doorway width. The apparatus comprises a sensor which: produces a signal when the card is presented thereto; and has thickness T, width W and height H. T<[thickness of other jamb−thickness of stop]. W is equivalent to the width of other surface. H<doorway height.

10 Claims, 5 Drawing Sheets

SECURITY APPARATUS

RELATED APPLICATION

This application claims the benefit of U.S. Provisional Patent Application Ser. No. 61/597,878, filed on Feb. 13, 2012, the disclosure of which is entirely incorporated herein by reference.

FIELD OF THE INVENTION

The present invention relates to the field of access control systems.

BACKGROUND OF THE INVENTION

RFID card and reader systems are well-known in the field of access control. In a typical system, a reader is mounted beside each door to be secured.

SUMMARY OF THE INVENTION

Forming one aspect of the invention is apparatus for use with an RFID proximity card and with a door assembly. The door assembly is of the type including a wood or metal door and a wood or metal frame. The wood or metal frame includes a pair of jambs. The wood or metal door is hingedly connected to one of the pair of jambs. The other of the pair of jambs is hollow and has a rabbet defined by a pair of surfaces. One of the pair of surfaces presents to the door when closed and defines part of a stop against which the door is positioned when closed. The other of the pair of surfaces flanks and presents towards the edge of the door when closed. The width of the other of the pair of surfaces is measured in the direction which defines the depth of the one of the pair of jambs. The thickness of the one of the pair of jambs is measured in the direction which defines the width of the doorway. The apparatus comprises a sensor which produces a first signal when the card is operatively presented thereto and has a thickness T, a width W and a height H. T<[total thickness of the other of the pair of jambs−thickness of the stop of the other of the pair of jambs]. W is substantially equivalent to the width of the other of the pair of surfaces. H<the height of the doorway.

According to another aspect of the invention: H can be about 2.75"; W can be about 1.5"; T can be less than 1.5"; the sensor can have a reading face which presents in a direction parallel to the dimension represented by the thickness of the sensor; and the sensor can produce the first signal at least when the card is placed in overlying relation to the reading face.

According to another aspect of the invention: T can be about 0.5".

According to another aspect of the invention: the sensor: in use, can be disposed in a cut-out in the other of the pair of surfaces; and can produce the first signal, when the door is closed, when the card is slid in the slot defined between the sensor and the door.

Forming another aspect of the invention is a system for use with a door assembly. The door assembly is of the type including a wood or metal door and a wood or metal frame. The wood or metal frame includes a pair of jambs. The wood or metal door is hingedly connected to one of the pair of jambs. The other of the pair of jams is hollow and has a rabbet defined by a pair of surfaces. One of the pair of surfaces presents to the door when closed and defines part of a stop against which the door is positioned when closed. The other of the pair flanks and presents towards the edge of the door when closed. The width of the other of the pair of surfaces is measured in the direction which defines the depth of the one of the pair of jams. The thickness of the one of the pair of jams is measured in the direction which defines the width of the doorway. The system comprises first RFID proximity cards and sensors. Each sensor, in use, is disposed in a cut-out in the other of the pair of surfaces and produces a signal, when the door is closed, when one of the first cards is slid in the slot defined between the sensor and the door.

According to another aspect of the invention, each sensor can have a thickness T, a width W and a height H. T can be <[total thickness of the other of the pair of jambs−thickness of the stop of the other of the pair of jambs]. W can be substantially equivalent to the width of the other of the pair of surfaces. H can be <the height of the doorway.

According to another aspect of the invention: H can be about 2.75"; W can be about 1.5"; T can be less than 1.5"; each sensor can have a reading face which presents in a direction parallel to the dimension represented by the sensor thickness; and can produce the first signal at least when the card is placed in overlying relation to the reading face.

According to another aspect of the invention, T can be about 0.5".

According to other aspects of the invention the first cards can be thin RFID cards and the system can further comprise thick prox cards. The sensors, in use, can be further adapted to produce the first signal at least when one of the thick prox cards is placed immediately in front of said each sensor and against the jamb in which said each sensor is mounted.

According to other aspects of the invention, the system can further comprise RHO fobs and the sensors can each, in use, be further adapted to produce the first signal at least when one of the RFID fobs is placed immediately in front of said each sensor and against the jamb in which said each sensor is mounted.

A method forms another aspect of the invention. The method is for use with the system and with a wood or metal door assembly. The assembly is of the type including a wood or metal door and a wood or metal frame. The wood or metal frame includes a pair of jambs. The wood or metal door is hingedly connected to one of the pair of jambs. The other of the pair of jambs is hollow and has a rabbet defined by a pair of surfaces. One of the pair of surfaces defines part of a stop which presents towards the door and against which the door is positioned when closed and the other of the pair of surfaces flanks the edge of the door when closed. The width of the other of the pair of surfaces is measured in the direction which defines the depth of the one of the pair of jams. The thickness of the one of the pair of jams is measured in the direction which defines the width of the doorway. The method comprises the steps of: cutting a hole in the other of the pair of surfaces; and mounting one of the sensors inside the other of the pair of jambs. The hole is shaped and dimensioned and the sensor is mounted such that the reading face substantially fully occupies the hole and lies flush with the other of the pair of surfaces.

Advantages of the invention will become apparent to persons of ordinary skill in the art upon review of the appended claims and upon review of the following detailed description of an exemplary embodiment of the invention.

DETAILED DESCRIPTION

Figure 1:
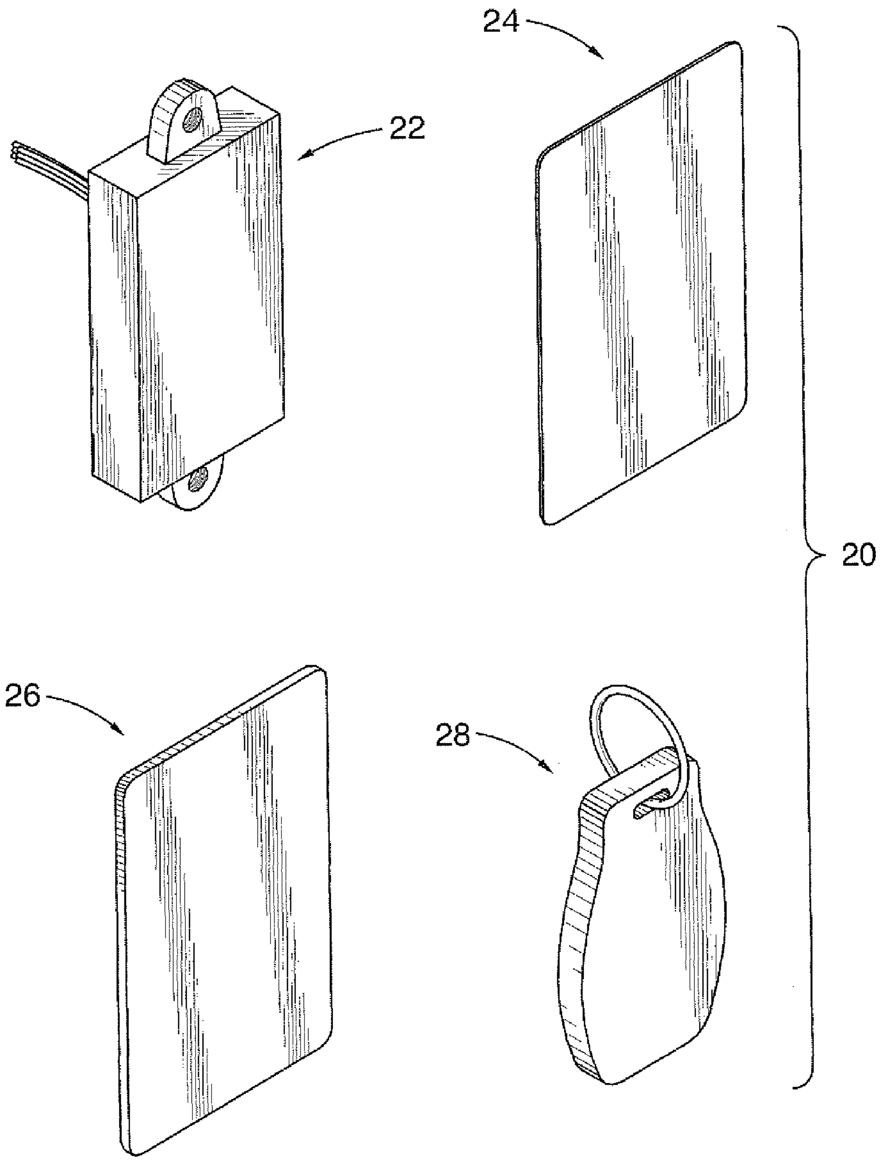
FIG. 1 shows the components of a system according to an exemplary embodiment of the invention.

Shown in FIG. 1 are the components of an exemplary access control system 20 that forms one aspect of the invention, the system 20 comprising a sensor assembly 22, a thin RFID proximity card 24, a thick RFID proximity card 26 and a RFID fob 28.

Figure 2:
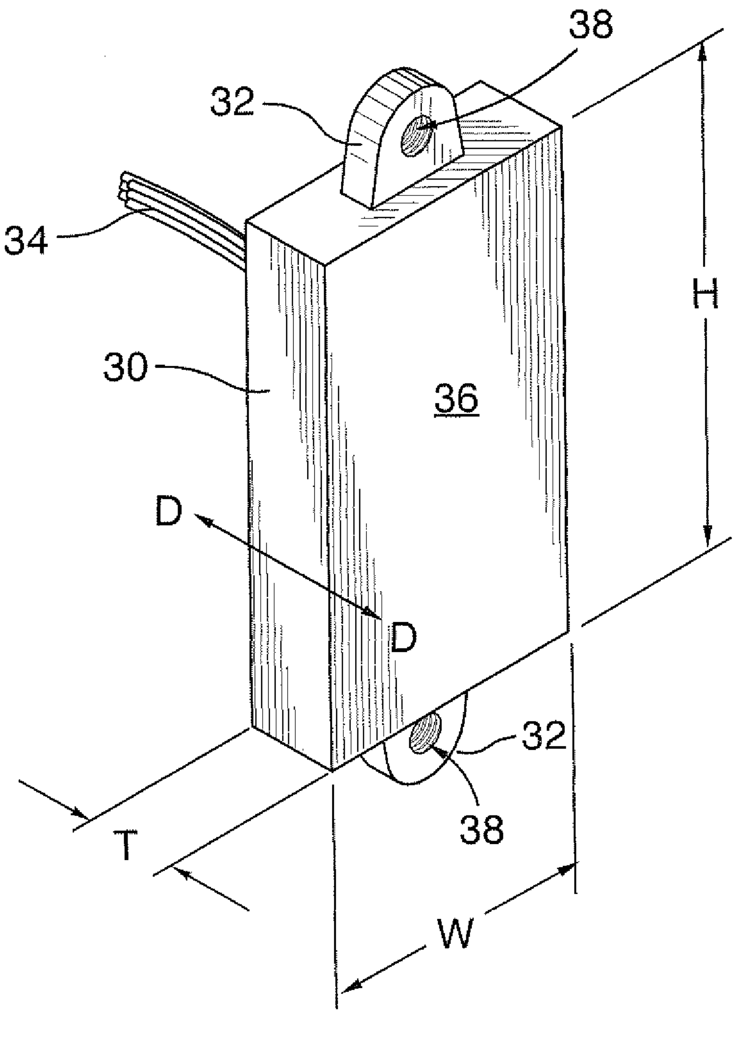
FIG. 2 is an enlarged view of encircled area 2 of FIG. 1.

The illustrated sensor assembly 22, best seen in FIG. 2, includes a sensor 30, a pair of mounting lugs 32 and a lead 34. The sensor 30 is a Wiegand-format RFID reader substantially in the form of a right rectangular prism, with a height H of 2.75", a width W of 1.5", a thickness T of 0.5" and a reading face 36 which presents in a direction D-D parallel to the dimension represented by the thickness of the sensor 30. The lugs 32 project, in offset relation to and from opposite ends of the reading face 36, each lug 32 having defined therein a respective threaded socket 38. The lead 34 is a 6-conductor lead.

The thin RFID proximity card 24, thick RFID proximity card 26 and RFID fob 28 are each of conventional construction and are adapted to cause the sensor 30 to produce a signal when operatively presented thereto, and accordingly are not described herein in detail.

Figure 3:
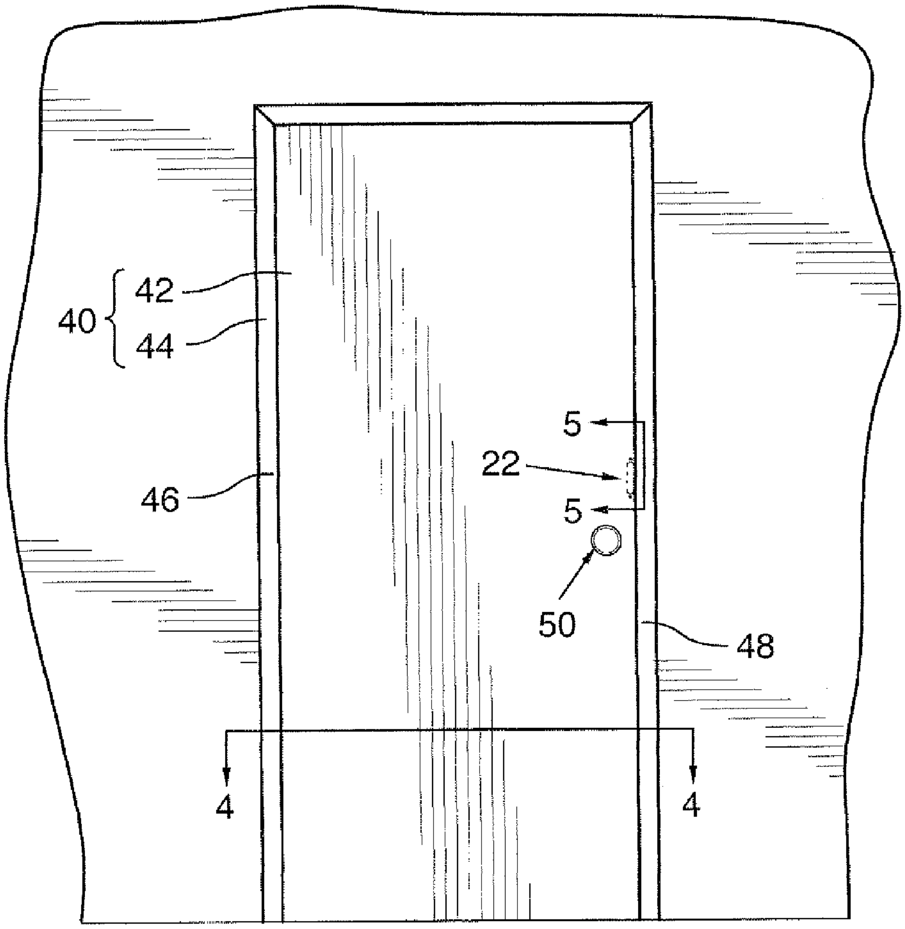
FIG. 3 is a front view of the structure of FIG. 2 in use with a door assembly.

Reference is now made to FIGS. 3-6 which show the sensor assembly 22 in use with a wood or metal door assembly 40, the sensor assembly 22 being shown in phantom in FIG. 3.

Figure 4:
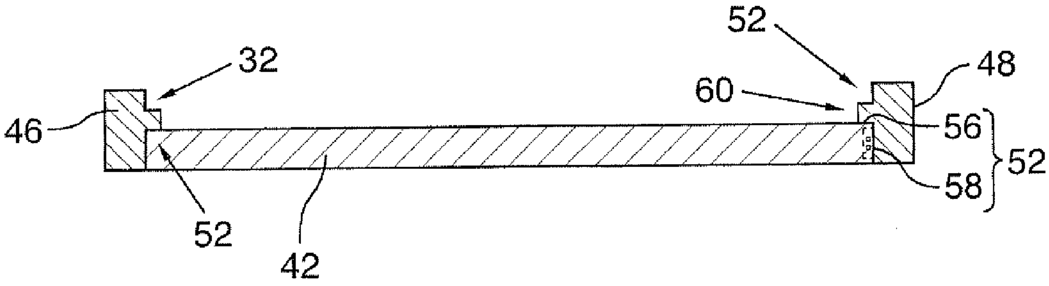
FIG. 4 is a view along 4-4 of FIG. 3.

With reference to FIG. 3 and FIG. 4, the door assembly 40 will be seen to be of the type including a wood or metal door 42 and a wood or metal frame 44. The door 42 is of conventional hollow construction. The frame 44 is of the type including a pair of jambs 46,48. One 46 of the pair of jams has the wood or metal door 42 hinged thereto; the other 48 of the pair of jambs carries the closure 50. Each of the jambs 46,48 is of the hollow double-rabbet wood or metal type, i.e. each jamb has a pair of rabbets 52. Each rabbet 52 is defined by a pair of surfaces 56,58. On the side of the frame 44 on which the door 42 is mounted, one 56 of the pair of surfaces defines part of a stop 60, presents towards the door 42 and has the door 42 positioned thereagainst when the door is closed. The other 58 of the pair of surfaces presents towards and flanks the free edge of the door 42 when the door is closed.

Figure 5:
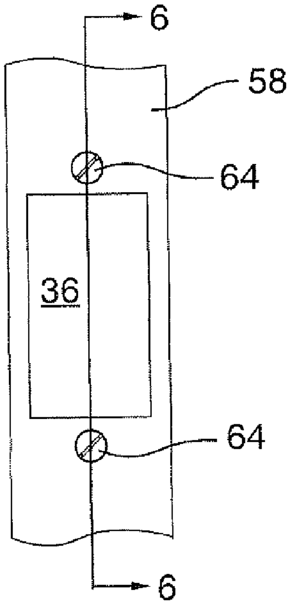
FIG. 5 is a view along 5-5 of FIG. 3.
Figure 6:
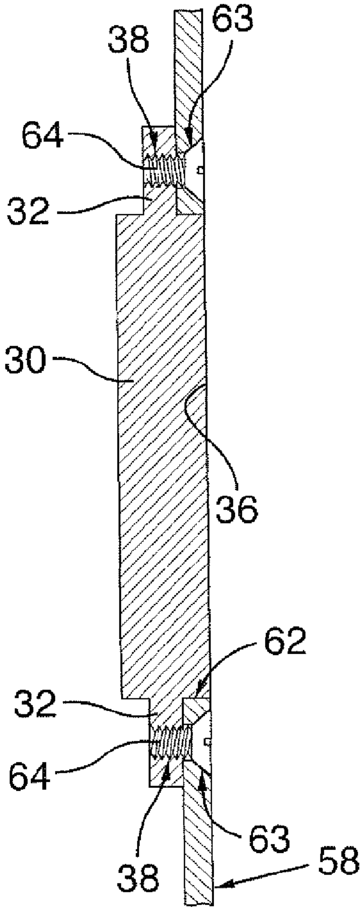
FIG. 6 is a view along 6-6 of FIG. 5.

FIGS. 5 and 6 show the manner in which the sensor assembly 22 is mounted. In this regard, it will be seen that the sensor 30 is disposed in a cut-out 62 in the other 58 of the pair of surfaces in the rabbet 52 which receives the door 42 and which is defined by the other 48 of the pair of jambs. The cut-out 62 is shaped and dimensioned and the sensor 30 is mounted such that the reading face 36 substantially fully occupies same and lies flush with the other 58 of the pair of surfaces. Bores 63, aligned with the threaded sockets 38, are defined in the other 58 of the pair of surfaces; screws 64 extend through the bores 63 and engage respective threaded sockets 38. Notwithstanding the metal construction of the door frame 44, which tends to defeat RF transmission, when the sensor assembly 22 is operatively mounted as indicated above and coupled into an access control system in a conventional manner (not shown), the sensor 30 produces a signal in use when, with the door closed in the frame, one of the thin prox cards 24 is operatively presented to the sensor, namely, by sliding (not shown) the card 24 between the sensor and the door. The sensor also produces a signal when:

- one of the thick prox cards 26 is placed immediately in front of said each sensor and against the jamb in which said each sensor is mounted
- one of the RFID fobs 28 is placed immediately in front of said each sensor and against the jamb in which said each sensor is mounted.

It will be evident that the sensor assembly has numerous advantages:

- it permits an RFID reader to be operatively mounted proximal to a door in an unobtrusive fashion;
- it avoids the need for a wall mount for an RFID reader;
- it can be installed on a retrofit basis; and
- it permits use with various types of conventional RFID devices as may be encountered in retrofit situations, such as thin RFID card, thick RFID card and RFID fob.

Figure 7:
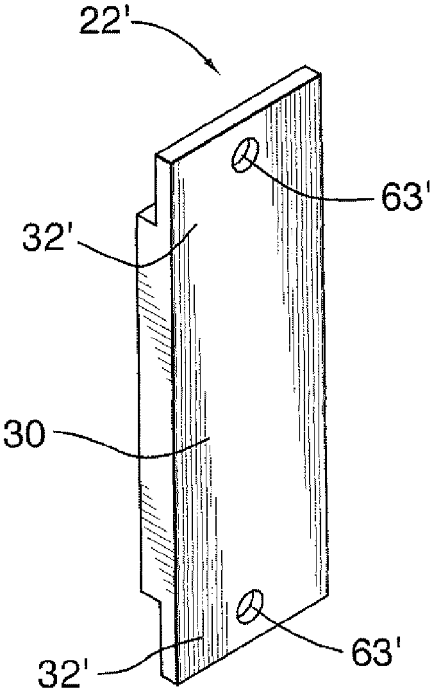
FIG. 7 is a view of a sensor assembly according to another embodiment of the invention.

FIG. 7 shows a sensor assembly 22' according to an alternative embodiment. This assembly is substantially similar to assembly 22, but has flush lugs 32' with simple bores 63, and is adapted to overlie the other of the pair of surfaces and be secured in threaded bores defined therein (not shown).

Yet further variations are possible.

For example, only, whereas a 6 wire conductor is specified, this is merely for convenience only, to permit usefulness of the exemplary device with conventional 6-conductor Wiegand systems. As but one alternative, a single three-wire conductor could be utilized.

As well, whereas metal is specified herein, this should be understood to include all common metals used to construct door, such as aluminum and steel.

Accordingly, the invention should be understood as limited only by the accompanying claims, purposively construed.

The invention claimed is:

1. Apparatus for use with an RFID proximity card and with a door assembly, the door assembly including a door and a frame, the frame including a pair of jambs, the door being hingedly connected to a first jamb of the pair of jambs, a second jamb of the pair of jambs being hollow and having a rabbet defined by a pair of surfaces, a first surface of the pair of surfaces presenting to the door when closed and defining part of a stop against which the door is positioned when closed and a second surface of the pair flanking and presenting towards the edge of the door when closed and defining a cut-out enclosed within the second surface, the width of the second surface of the pair of surfaces being measured in the direction which defines the depth of the first jamb of the pair of jambs, the thickness of the first jamb of the pair of jambs being measured in the direction which defines the width of the doorway, the apparatus comprising:

a sensor configured to mount in the frame of the door assembly such that a slot is formed between the sensor and the door when the door is closed in the door assembly, the sensor configured to produce a first signal when the card is operatively presented thereto in said slot formed between the sensor and the door when the door is closed in the door assembly; and has a thickness T, a width W and a height H, wherein T is less than a total thickness of the second jamb of the pair of jambs minus a thickness of the stop of the second jamb of the pair of jambs, W is substantially equivalent to the width of the second surface of the pair of surfaces, and H is less than the height of the doorway.

2. Apparatus according to claim 1, wherein

H is about 2.75";

W is about 1.5";

T is less than 1.5";

the sensor has a reading face which presents in a direction parallel to the dimension represented by the thickness of the sensor; and the sensor produces the first signal at least when the card is placed in overlying relation to the reading face.

3. Apparatus according to claim 2, wherein T is about 0.5".

4. A system for use with a door assembly, the door assembly including a door and a frame, the frame including a pair of jambs, the door being hingedly connected to a first jamb of the pair of jams, a second jamb of the pair of jams being hollow and having a rabbet defined by a pair of surfaces, a first surface of the pair of surfaces presenting to the door when closed and defining part of a stop against which the door is positioned when closed and a second surface of the pair flanking and presenting towards the edge of the door when closed and defining a cut-out enclosed within the second surface, the width of the second surface of the pair of surfaces being measured in the direction which defines the depth of the first jamb of the pair of jams, the thickness of the first jamb of the pair of jams being measured in the direction which defines the width of the doorway, the system comprising:

one or more RFID proximity cards; and one or more sensors, each sensor configured to mount in the frame of the door assembly such that a slot is formed between the sensor and the door when the door is closed in the door assembly and configured to produce a signal when the one or more RFID proximity cards are slid in the slot.

5. The system according to claim 4, wherein each sensor has a thickness T, a width W, and a height H, wherein T is less than a total thickness of the second jamb of the pair of jambs minus a thickness of the stop of the second jamb of the pair of jambs, W is substantially equivalent to the width of the second surface of the pair of surfaces, and H is less than the height of the doorway.

6. The system according to claim 5, wherein

H is about 2.75",

W is about 1.5",

T is less than 1.5", and each sensor has a reading face which presents in a direction parallel to the dimension represented by the sensor thickness and produces the signal at least when the one or more RFID proximity cards are placed in overlying relation to the reading face.

7. The system according to claim 6, wherein T is about 0.5".

8. The system according to claim 4, wherein the one or more RFID proximity cards include a thin RFID card and a thick proximity card; and wherein the one or more sensors are further configured to produce the signal at least when the thick proximity card is placed against the jamb in which the one or more sensors are mounted.

9. The system according to claim 4, wherein the one or more RFID proximity cards further include one or more RFID fobs; and wherein the one or more sensors are each further configured to produce the signal at least when the one or more RFID fobs are placed against the jamb in which the one or more sensors are mounted.

10. A method for use with the system of claim 5 and with a door assembly, the assembly including a door and a frame, the frame including a pair of jambs, the door being hingedly connected to a first jamb of the pair of jambs, a second jamb of the pair of jambs being hollow and having a rabbet defined by a pair of surfaces, a first surface of the pair of surfaces defining part of a stop which presents towards the door and against which the door is positioned when closed and a second surface of the pair of surfaces flanking the edge of the door when closed and defining a cut-out enclosed within the second surface, the width of the second surface of the pair of surfaces being measured in the direction which defines the depth of the first jamb of the pair of jambs, the thickness of the first jamb of the pair of jambs being measured in the direction which defines the width of the doorway, the method comprising the steps of:

cutting a hole in the second surface of the pair of surfaces; and mounting one of the sensors inside the second jamb of the pair of jambs, wherein the hole is shaped and dimensioned and the sensor is mounted such that the reading face substantially fully occupies the hole and lies flush with the second surface of the pair of surfaces such that a slot is formed between one of the sensors and the door when the door is closed in the door assembly.

* * * * *